United States Patent
Piette et al.

(10) Patent No.: US 10,486,788 B2
(45) Date of Patent: Nov. 26, 2019

(54) SURVEILLANCE DRONE INCLUDING GAS-FILLED CONTAINER AND PROPELLERS FOR AERIAL MOBILITY

(71) Applicant: Avigilon Corporation, Vancouver (CA)

(72) Inventors: Kevin Piette, Carlisle, MA (US); Pietro Russo, Melrose, MA (US); Bo Yang Yu, Winchester, MA (US)

(73) Assignee: Avigilon Corporation, Vancouver (CA)

( * ) Notice: Subject to any disclaimer, the term of this patent is extended or adjusted under 35 U.S.C. 154(b) by 285 days.

(21) Appl. No.: 15/493,463

(22) Filed: Apr. 21, 2017

(65) Prior Publication Data

US 2018/0304981 A1    Oct. 25, 2018

(51) Int. Cl.
| | |
|---|---|
| *B64B 1/40* | (2006.01) |
| *B64B 1/66* | (2006.01) |
| *B64F 1/14* | (2006.01) |
| *B64D 47/08* | (2006.01) |
| *B64B 1/30* | (2006.01) |
| *B64C 39/02* | (2006.01) |
| *H04N 7/18* | (2006.01) |
| *H04N 5/225* | (2006.01) |
| *H04N 5/232* | (2006.01) |
| *B60L 53/16* | (2019.01) |
| *B64B 1/22* | (2006.01) |

(52) U.S. Cl.
CPC .............. *B64B 1/66* (2013.01); *B60L 53/16* (2019.02); *B64B 1/22* (2013.01); *B64B 1/30* (2013.01); *B64C 39/024* (2013.01); *B64D 47/08* (2013.01); *B64F 1/14* (2013.01); *H04N 5/2251* (2013.01); *H04N 5/232* (2013.01); *H04N 7/185* (2013.01); *B60L 2200/10* (2013.01); *B64B 1/40* (2013.01); *B64C 2201/022* (2013.01); *B64C 2201/101* (2013.01); *B64C 2201/127* (2013.01); *B64C 2201/165* (2013.01); *B64C 2201/18* (2013.01); *B64C 2201/182* (2013.01)

(58) Field of Classification Search
CPC .......... B64C 2201/022; B64C 2201/18; B64C 2201/182; B64F 1/02; B64F 1/14; B64F 1/22; B64F 1/222; B64B 1/40; B64B 1/66
USPC ........................................ 244/31, 114 R, 115
See application file for complete search history.

(56) References Cited

U.S. PATENT DOCUMENTS

| | | | |
|---|---|---|---|
| 4,891,029 A | 1/1990 | Hutchinson | |
| 4,931,028 A | 6/1990 | Jaeger et al. | |
| 6,520,824 B1 | 2/2003 | Caroselli | |
| 6,609,945 B2 | 8/2003 | Jimenez et al. | |
| 7,055,777 B2 | 6/2006 | Colting | |

(Continued)

FOREIGN PATENT DOCUMENTS

WO    WO 2016/076684 A1    11/2014

OTHER PUBLICATIONS

Charles Haine; "Is a drone-balloon hybrid a match made in heaven?"; Jul. 22, 2016; 6 pages.

(Continued)

*Primary Examiner* — James S Bergin
(74) *Attorney, Agent, or Firm* — Daniel Hammond

(57) ABSTRACT

A surveillance drone is disclosed. The surveillance drone includes a gas-filled container and propellers for aerial mobility. The surveillance drone also includes an electronic surveillance sensing device positioned below the gas-filled container. The gas-filled container may be filled with a lighter than air gas such as, for example, helium.

16 Claims, 11 Drawing Sheets

(56) References Cited

U.S. PATENT DOCUMENTS

| | | | |
|---|---|---|---|
| 9,260,028 B2 * | 2/2016 | Worley, III | A63J 1/00 |
| 9,387,928 B1 | 7/2016 | Gentry et al. | |
| 10,000,284 B1 * | 6/2018 | Purwin | B64B 1/26 |
| 10,007,890 B1 * | 6/2018 | Purwin | G06Q 10/087 |
| 10,029,803 B1 * | 7/2018 | Larsen | B64D 39/00 |
| 10,370,122 B2 * | 8/2019 | Fisher | B64C 39/024 |

OTHER PUBLICATIONS

Datasheet retrieved Nov. 24, 2016, from the website for Blossom Enterprises; http://blossom.enterprises/hansolo.html; 3 pages.
Datasheet retrieved Feb. 24, 2017, from the website for R/C Airplane World; http://www.rc-airplane-world.com/rc-blimps.html; 7 pages.
Datasheet retrieved Mar. 24, 2017, from the website for Fotokite; http://www.cebit.de/product/fotokite/2267220/G292252; 3 pages.
Machine translation of French published PCT application; WO 2016/076684 A1; 4 pages.

* cited by examiner

SURVEILLANCE DRONE INCLUDING GAS-FILLED CONTAINER AND PROPELLERS FOR AERIAL MOBILITY

FIELD

The present subject-matter relates to a surveillance drone and, in particular, to a surveillance drone that includes a gas-filled container and propellers for aerial mobility.

BACKGROUND

A camera may be used to acquire information about a place or an object. The information is visual image data generated by the camera corresponding to the scene falling with the field of view of the camera.

A typical video surveillance system uses one or more cameras to acquire information about an area being monitored. The one or more cameras are placed in strategic locations to ensure appropriate coverage of the area being monitored. When deployed within the typical video surveillance system, the cameras are static.

SUMMARY

According to one example embodiment, there is provided an apparatus that includes a drone. The drone includes a container capable of being filled with a gaseous fluid and a mating region located on a top side of the drone. A plurality of motor-driven propellers are configured to control movement of the drone when it is aerially mobile. An electronic surveillance sensing device is positioned below the container. A rechargeable power source is configured to power at least the electronic surveillance sensing device. The apparatus also includes a docking station that includes a drone-receiving port. The drone is configured to dock with the docking station when the mating region of the drone engages the drone-receiving port. A charger is configured to charge the rechargeable power source when the drone is docked thereto. The docking station is configured to be installed on a surface that affords a downwards orientation for the drone-receiving port such that the drone will be below the docking station when docked thereto.

According to another example embodiment, there is provided an apparatus that includes a tether having first and second ends and enclosing wires configured to provide a path for at least power. The apparatus includes a drone that includes a container capable of being filled with a gaseous fluid. An attachment location is on a top side of the drone, and the first end of the tether is attached to the drone at the attachment location. A plurality of motor-driven propellers are configured to control movement of the drone when aerially mobile. An electronic surveillance sensing device is positioned below the container. The apparatus also includes a docking station that includes a retractor configured to adjust a length of the tether based on a distance of the drone from the docking station. A second end of the tether is attached to the retractor. A power source is configured to deliver power to the drone via the path provided in the tether. The docking station is configured to be installed on a surface that affords a downwards orientation such that the drone will be below and adjacent (or below and pressed against) the docking station when the tether is fully retracted into the docking station.

BRIEF DESCRIPTION OF THE DRAWINGS

Reference will now be made, by way of example, to the accompanying drawings.

Figure 1:
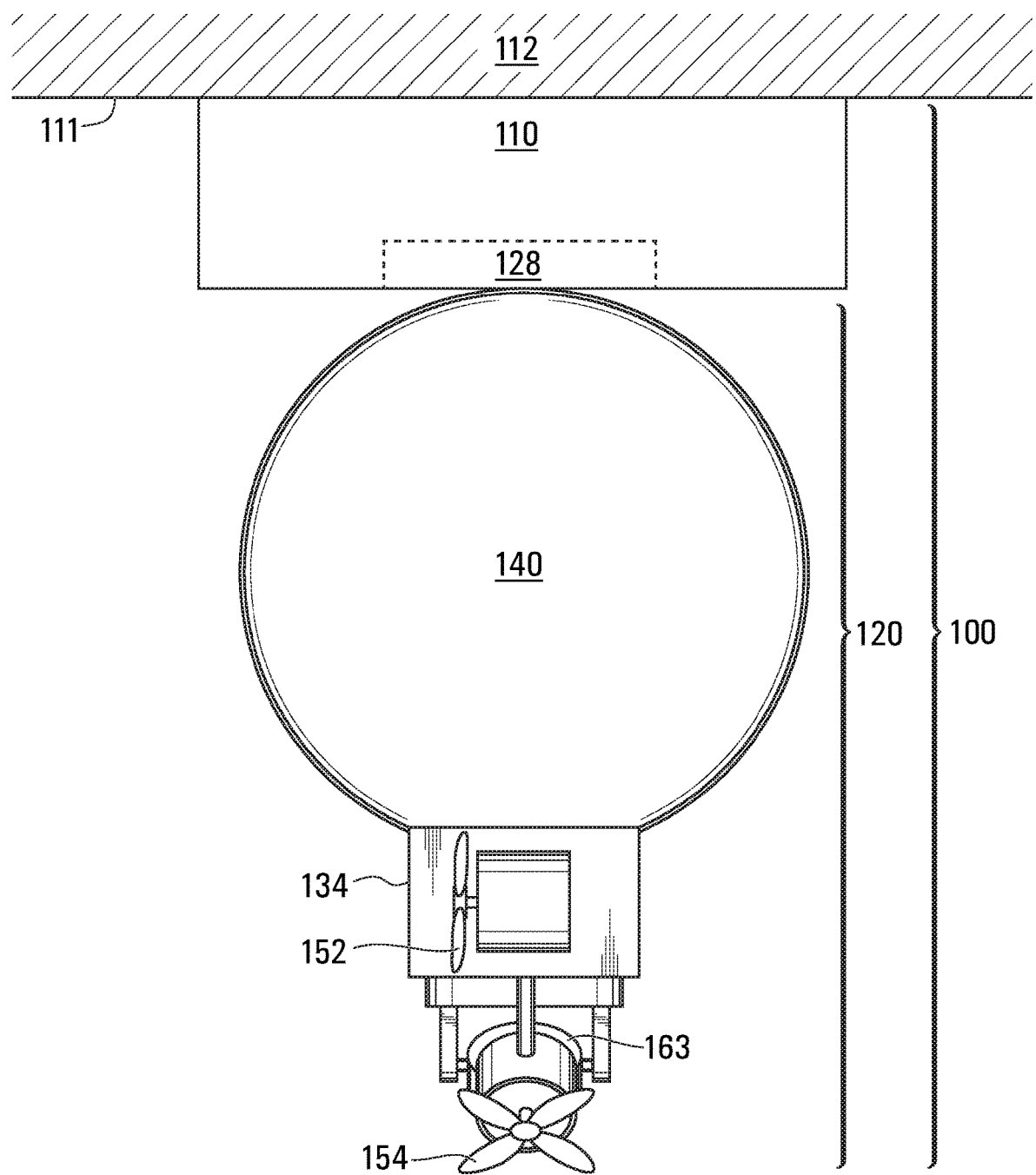
FIG. 1 is an end elevational view of a surveillance drone and docking station assembly, diagrammatically illustrated in accordance with at least one example embodiment.

Similar or the same reference numerals may have been used in different figures to denote similar example features illustrated in the drawings. Also, because the drawings are diagrammatic, they do not necessarily show features that one skilled in the art would readily be understood to be present and/or are ancillary to an understanding of example embodiments. For instance, motors for propellers are not shown in any significant detail in the drawings, nor are electrical paths for sourcing power to those motors.

DETAILED DESCRIPTION OF EXAMPLE EMBODIMENTS

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

The term "electronic surveillance sensing device" as used herein may refer to a camera; however it may also refer to other types of surveillance devices that capture and electronically process received stimulus. Examples of electronic surveillance sensing devices include a two-dimensional camera with an image sensor, a radar sensing device (which does not capture a visual image), a three-dimensional camera, etc.

Various software herein described may be provided on any suitable computer-usable or computer readable medium. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example software herein described may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Figure 2:
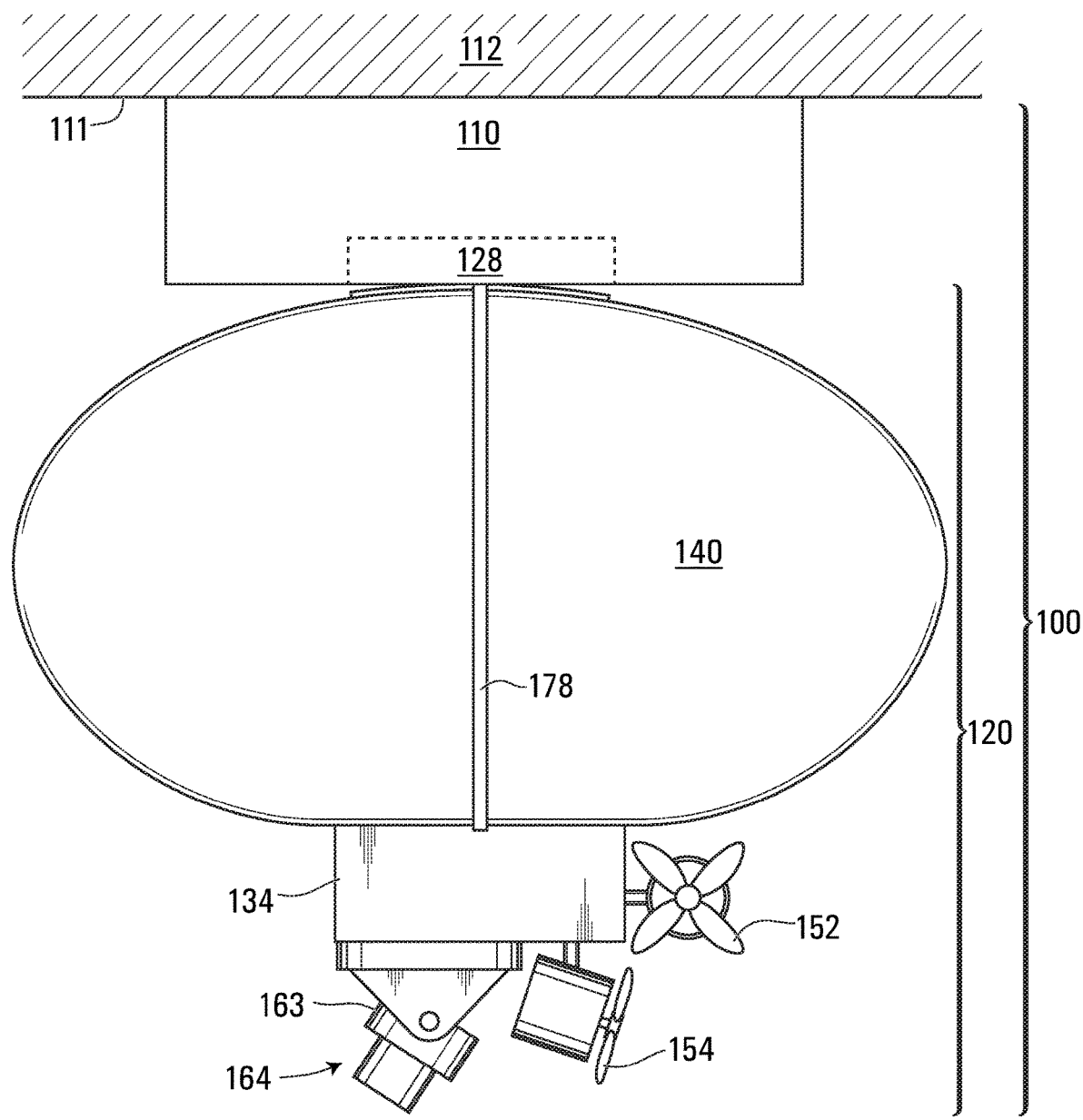
FIG. 2 is a side elevational view of the diagrammatically illustrated surveillance drone and docking station assembly of FIG. 1.

Reference is now made to FIGS. 1 and 2 which diagrammatically illustrate a drone and docking station assembly 100 in accordance with at least one example embodiment. In the illustrated example embodiment a docking station 110 of the assembly 100 is installed on a surface 111 of a ceiling 112. The ceiling 112 is made of any suitable material allowing the docking station 110 to be secured thereto. Of course the ceiling 112 forms part of a premises. The premises may include one or more buildings such as for example, a house, a semi-permanent erectable structure, an agricultural building, an office/commercial building, an apartment/residential building, an educational building, a government building, an industrial building, a military building, a parking structure, a storage building, a religious building, a public transport building, a data center building, a power station/plant or any combination of these buildings.

As shown, the docking station 110 is located above a surveillance drone 120 of the assembly 100. In this regard, the docking station 110 is installed on the surface 111 with an orientation such that a drone-receiving port 128 of the docking station 110 is given a downwards orientation such that the surveillance drone 120 will be below the docking station 110 when docked thereto.

Still with reference to FIGS. 1 and 2, the illustrated surveillance drone 120 includes a gondola body 134 to which a number of parts are attached. Attached to the bottom of the gondola body 134 is a housing 163 of an electronic surveillance sensing device 164. In some examples, the electronic surveillance sensing device 164 is made as lightweight as possible so as to help minimize the weight of the surveillance drone 120 when it is aerially mobile. In some examples, the electronic surveillance sensing device 164 is able to move in a manner so as to change its Field Of View (FOV). For instance, the electronic surveillance sensing device 164 may be a Pan-Tilt-Zoom (PTZ) camera or the electronic surveillance sensing device 164 may have some subset of PTZ movement capabilities (for example, the electronic surveillance sensing device 164 may be able to tilt and/or zoom but not pan).

Attached to the top of the gondola body 134 is an inflatable container 140. In the illustrated state, the inflatable container 140 is filled with a lighter than air gaseous fluid such as, for example, helium. Also, it will be understood that the inflatable container 140 illustrated in the drawings is not shown to scale. In an inflated state, the inflatable container 140 may have actual dimensions much larger (i.e. relative to other illustrated parts of the surveillance drone 120) than as it appears to be sized in the drawings. Those skilled in the art will appreciate that the inflatable container 140 should be large enough to hold enough helium to keep the drone 120 afloat. For example, if one assumes conditions of 20° C. and 1 atm, and also one assumes that the container is not over pressurized (e.g. $P_{container} < 1.01 * P_{atm}$), then a hypothetical circular balloon of say 2 feet in diameter should well be able to support a payload of up to 100 g.

Also, those skilled in the art will understand that the inflatable container 140 is made of a light weight material that retains the gaseous fluid for an extended time without performance impacting loss to the outside air. In accordance with some examples, the inflatable container 140 is made of a metalized polymer material such as, for example, Biaxially-oriented polyethylene terephthalate (BoPET) commonly known as Mylar™.

Attached to the sides of the gondola body 134 are motor-driven propellers 152 and 154 that are able to control movement of the surveillance drone 120 when it is aerially mobile. In the illustrated example, the motor-driven propeller 152 is oriented perpendicular to a vertical axis and the motor-driven propeller 154 is oriented at a 45° angle the vertical axis. According to the illustrated propeller arrangement, motion can be controlled as detailed in Table 1 below.

TABLE 1

Motion Control for Drone 120

| Motion | Propeller 152 | Propeller 154 |
| --- | --- | --- |
| Forward and Up | Off | On |
| Down | Off | Off |
| Port Turn | Reverse | Slow Speed |
| Starboard Turn | On | Slow Speed |
| Reverse and Down | Off | Reverse |

From Table 1 it is clear that neither propeller 152 nor propeller 154 are driven when descent motion is desired. This is because the surveillance drone 120 as a whole is weighted to be very slightly heavier than air, so that it will naturally descend when the propeller 154 is not driven.

Example embodiments are not limited to employing only two motor-driven propellers. In some examples, the surveillance drone includes any suitable number of motor-driven propellers greater than one.

Figure 3:
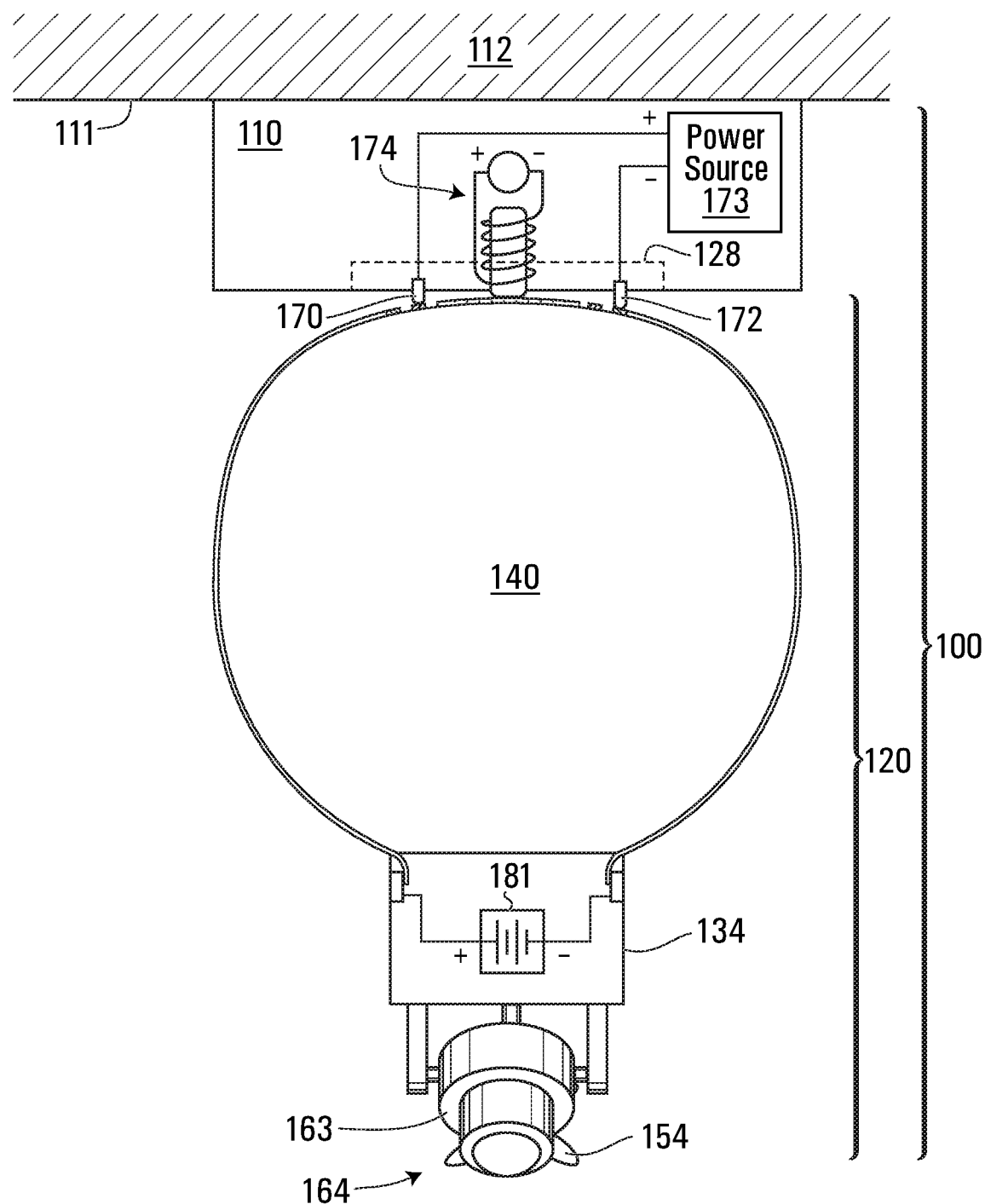
FIG. 3 is another end elevational view of the diagrammatically illustrated surveillance drone and docking station assembly, showing more details of the docking station than as illustrated in FIG. 1.
Figure 4:
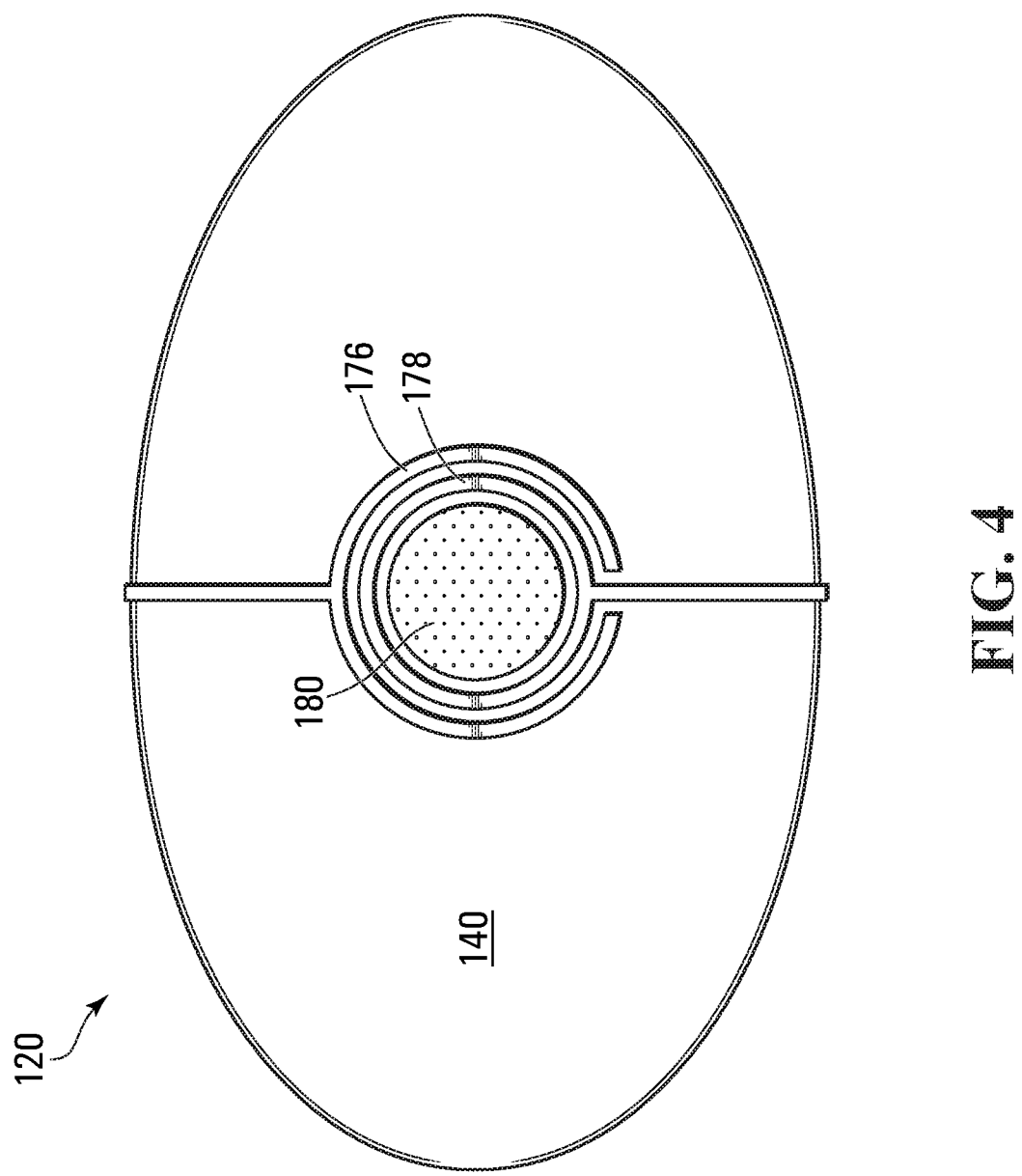
FIG. 4 is a top view of the drone forming part of the diagrammatically illustrated surveillance drone and docking station assembly of FIG. 1.

FIG. 3 shows more details of the docking station 110 and FIG. 4 diagrammatically illustrates a top view of the surveillance drone 120. With reference to these two figures, metal conduction path 176 electrically connects to metal contact 172 on the docking station 110 when docked thereto. Similarly metal conduction path 178 electrically connects to metal contact 170 on the docking station 110 when docked thereto.

As shown in FIG. 4, the metal conduction path 176 has a circular shape at the top of the surveillance drone 120, and then becomes a single band extending around towards the bottom of the inflatable container 140. Similarly the metal conduction path 178 has a circular shape at the top of the surveillance drone 120, and then becomes a single band extending around towards the bottom of the inflatable container 140. Shape, size and placement of the metal conduction paths 176 and 178 will vary. For example, instead of a circular shape at the top of the surveillance drone 120, these portions could alternatively take on some other shape (for instance, square, rectangle, trapezoid, etc.). Also at the top of the surveillance drone 120 is a ferrous sheet 180. When turned on, an electromagnet 174 included within the docking station 110 magnetically attracts the ferrous sheet 180, and the magnetic force serves to retain the surveillance drone 120 fixedly to the docking station 110. Shape, size and placement of the ferrous sheet will vary. For example, instead of a circular shape at the top of the surveillance drone 120, the ferrous sheet 180 could alternatively take on some other shape (for instance, square, rectangle, trapezoid, etc.). Also, instead of a single ferrous sheet, there could be a plurality of spaced apart ferrous sheets each configured to become aligned with a respective one of a plurality of electromagnets upon docking of the surveillance drone 120 to the docking station 110.

The metal conduction paths 176 and 178 extend down into a gondola body 134 of the surveillance drone 120 so as to source power from power source 173 within the docking station 110 down to rechargeable battery 181. The power source 173 is a charger for the rechargeable battery 181 (a rechargeable power source) which will serve to power electronics within the surveillance drone 120 when it becomes undocked from the docking station 110. In some example embodiments, tradeoffs may be made between battery life and performance of the electronic surveillance sensing device 164. For example, H.264 or H.265 encoding may be employed where the frame rate and resolution of the electronic surveillance sensing device 164 is sufficiently high such that such encoding may prolong battery life.

Figure 5:
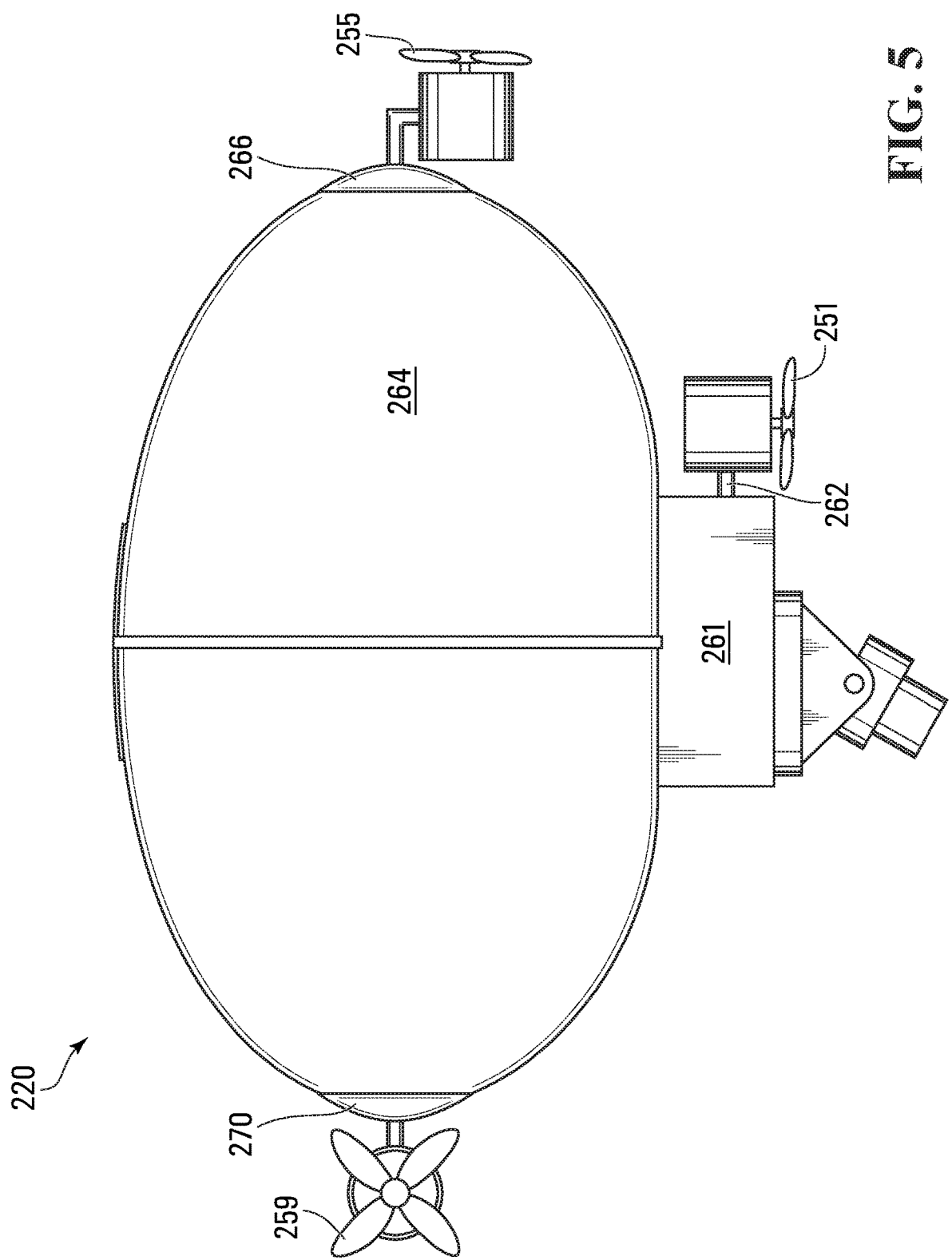
FIG. 5 diagrammatically illustrates a surveillance drone in accordance with an alternative example embodiment.

FIG. 5 diagrammatically illustrates a surveillance drone 220 in accordance with an alternative example embodiment. The surveillance drone 220 is similar in most respects to the surveillance drone 120; however the number and arrangement of the propellers are different. In this regard, the drone 220 includes three propellers 251, 255 and 259. The propeller 251 is for vertically oriented thrust and is attached to gondola body 261 by way of a connecting member 262. Regarding the propeller 255, this is a forward motion propeller that is attached to container 264 of the surveillance drone 220 by way of a nipple connecting part 266. Regarding the propeller 259, this is a yaw propeller that is attached to the container 264 by way of a nipple connecting part 270. According to the illustrated propeller arrangement, motion can be controlled as detailed in Table 2 below.

TABLE 2

Motion Control for Drone 220

| Motion | Propeller 251 | Propeller 255 | Propeller 259 |
|---|---|---|---|
| Up | On | Off | Off |
| Down | Reverse | Off | Off |
| Port Turn | Off | Off | Reverse |
| Starboard Turn | Off | Off | On |
| Forward | Off | On | Off |
| Reverse | Off | Reverse | Off |

Figure 6:
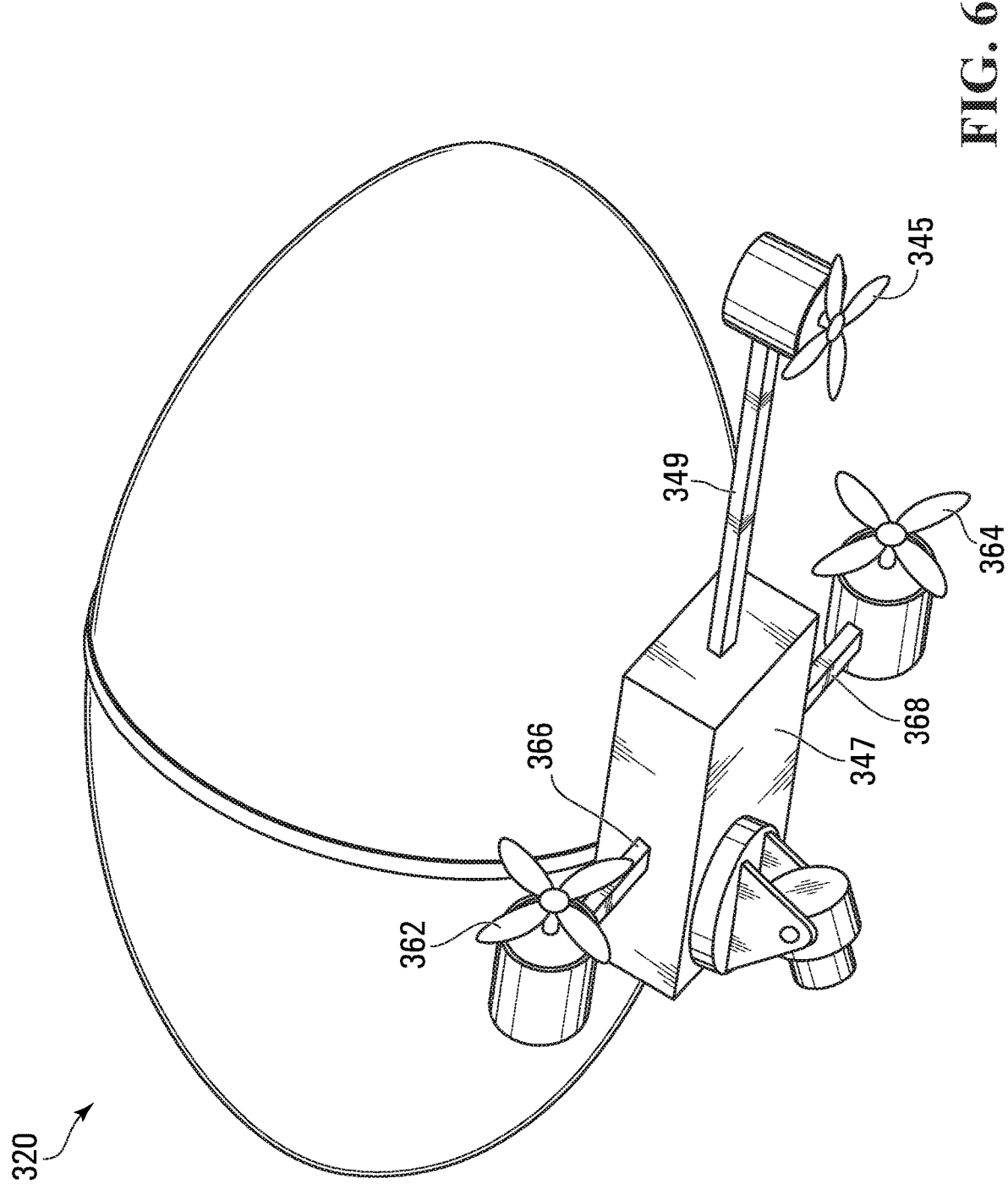
FIG. 6 diagrammatically illustrates a surveillance drone in accordance with another alternative example embodiment.

FIG. 6 diagrammatically illustrates a surveillance drone 320 in accordance with yet another alternative example embodiment. The drone 320 includes three propellers. In particular, a propeller 345 is attached to a gondola body 347 (by way of connecting member 349) for vertically oriented thrust. Two tandem propellers 362 and 364 are the remaining two of the three propellers that are disposed on the drone 320. In particular, the propellers 362 and 364 are attached to the gondola body 347 by way of connecting members 366 and 368 respectively. According to the illustrated propeller arrangement, motion can be controlled as detailed in Table 3 below.

TABLE 3

Motion Control for Drone 320

| Motion | Propeller 345 | Propeller 362 | Propeller 364 |
|---|---|---|---|
| Up | On | Off | Off |
| Down | Reverse | Off | Off |
| Port Turn | Off | Off or Reverse | On |
| Starboard Turn | Off | On | Off or Reverse |
| Forward | Off | On | On |
| Reverse | Off | Reverse | Reverse |

Figure 7:
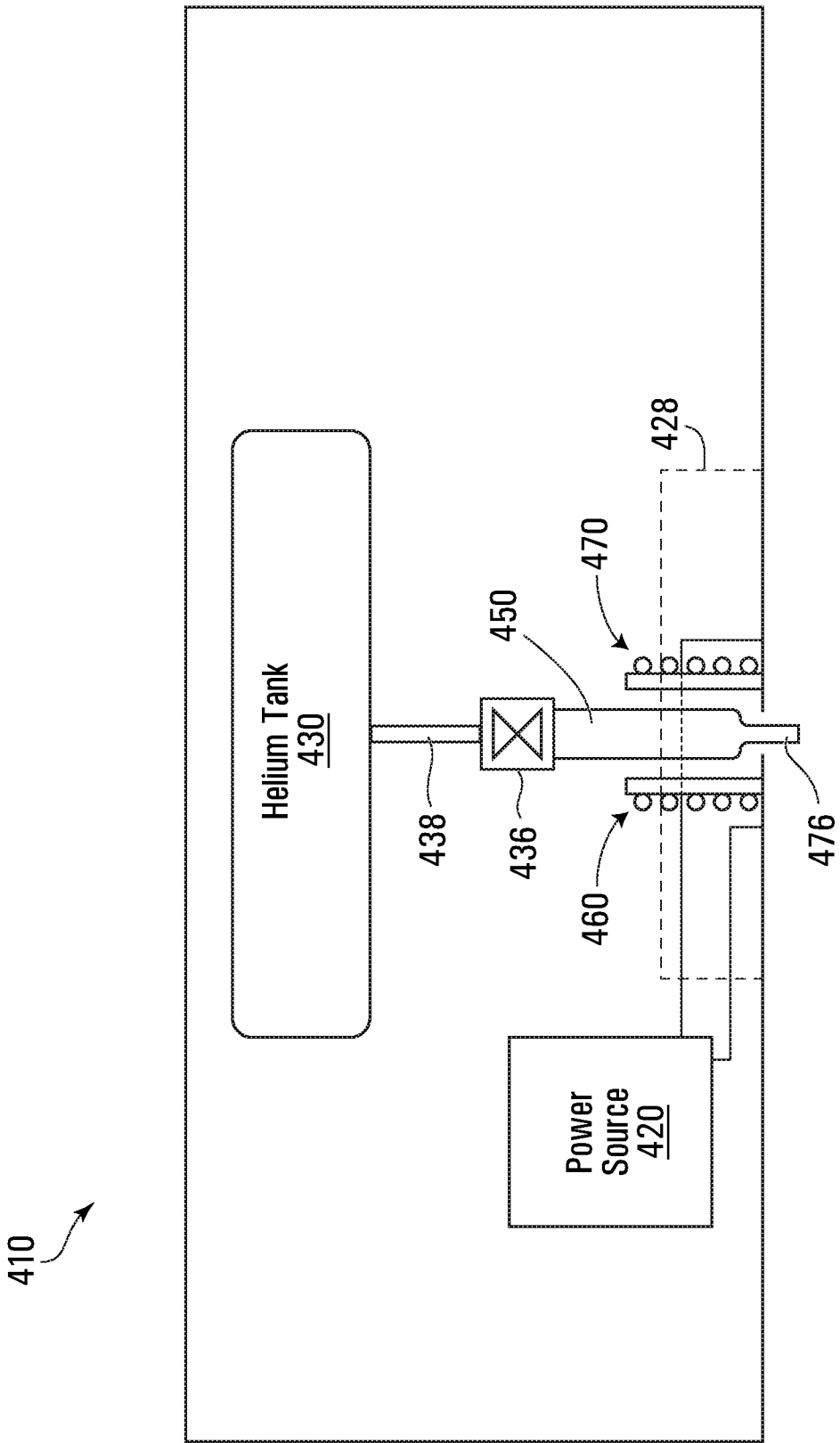
FIG. 7 shows a block diagram of a docking station in accordance with at least one alternative example embodiment.

FIG. 7 shows a block diagram illustrating details of a docking station 410 constructed in accordance with an alternative example embodiment. When docked in drone-receiving port 428, the drone is able to be replenished with power provided by power source 420 and helium provided by helium tank 430. In terms of helium delivery, a pressure regulator 436 is connected to the helium tank 430 by suitable tubing 438. The pressure regulator 436 selectively permits helium to be delivered via nozzle 450 to the drone if pressure inside the gas-fillable container of the drone is sufficiently low. Tip 476 of the nozzle 450 is configured to penetrate a small elastic and self-closing aperture at the top of the gas-fillable container of the drone. In some examples, the tip 476 may be controlled to descend from a retracted position to facilitate penetration of the above-mentioned aperture.

Figure 8:
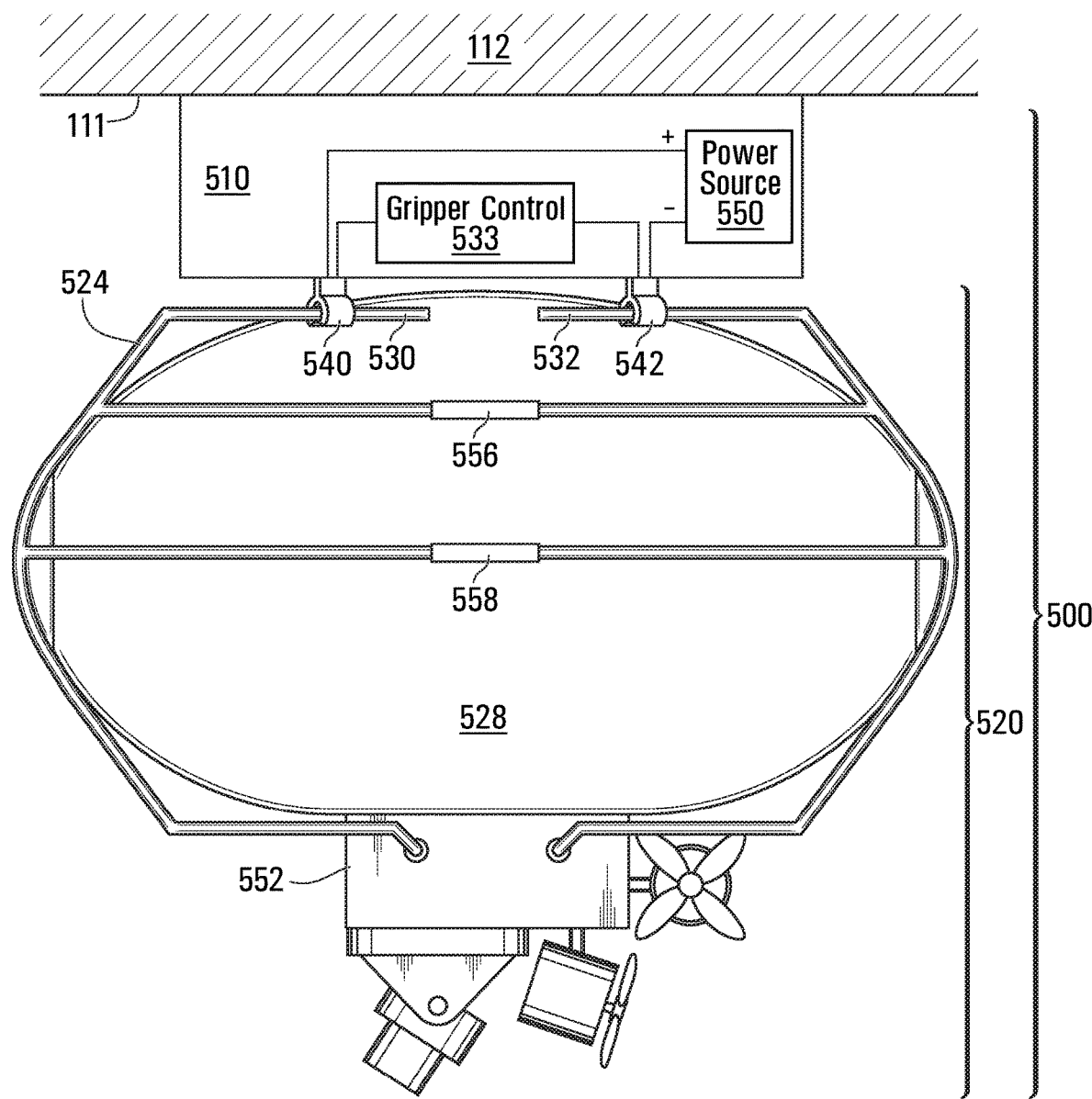
FIG. 8 is a side elevational view of a surveillance drone and docking station assembly, diagrammatically illustrated in accordance with an alternative example embodiment.

FIG. 8 shows a side elevational view of a surveillance drone and docking station assembly 500, diagrammatically illustrated in accordance with an alternative example embodiment. The surveillance drone and docking station assembly 500 includes a docking station 510 and a surveillance drone 520. Various elements of the docking station 510 and the surveillance drone 520 have been omitted for convenience of illustration and so as not to obscure an understanding of those elements that are shown.

Regarding the surveillance drone 520, it is similar to the surveillance drone 120 shown in FIG. 2; however instead of having the conduction paths 176 and 178 extending over the outer surface of the inflatable container 140, there is instead an electrically conducting cage 524 surrounding the entire container 528 of the surveillance drone 520. During docking to the docking station 510, a pair of grippers 540 and 542 (movable between open and closed states) are initially in an open state. Eventually the surveillance drone 520 and the cage 524 move into sufficiently close position to the grippers 540 and 542 then, at such point in time, each of the grippers 540 and 542 can close and thereby grasp on to and fixedly hold a respective one of frame members 530 and 532. Gripper control 533 controls opening and closing of the grippers based on, for example, proximity detection as between the surveillance drone 520 and the docking station 510. Those skilled in the art will appreciate the various known methods for proximity detection such as, for example employing a 3D camera which could be attached to the docking station 510.

Since each of the frame members 530 and 532 is electrically conducting, power can be sourced from power source 550 down via other connecting frame members all the way to electronics and a rechargeable battery housed within gondola 552 of the surveillance drone 520. Those skilled in the art will appreciate that a short circuit would result if all of the cage 524 were to be made of electrically conducting members. Accordingly a plurality of cage segments including cage segments 556 and 558 are made of non-electrically conducting material. Also, it will be appreciated that although a pair of grippers are shown in FIG. 8, it is contemplated that any suitable number of grippers greater than two could be employed regardless of whether each would grip its own respective frame member or grip a same frame member as one of the other grippers.

Figure 9:
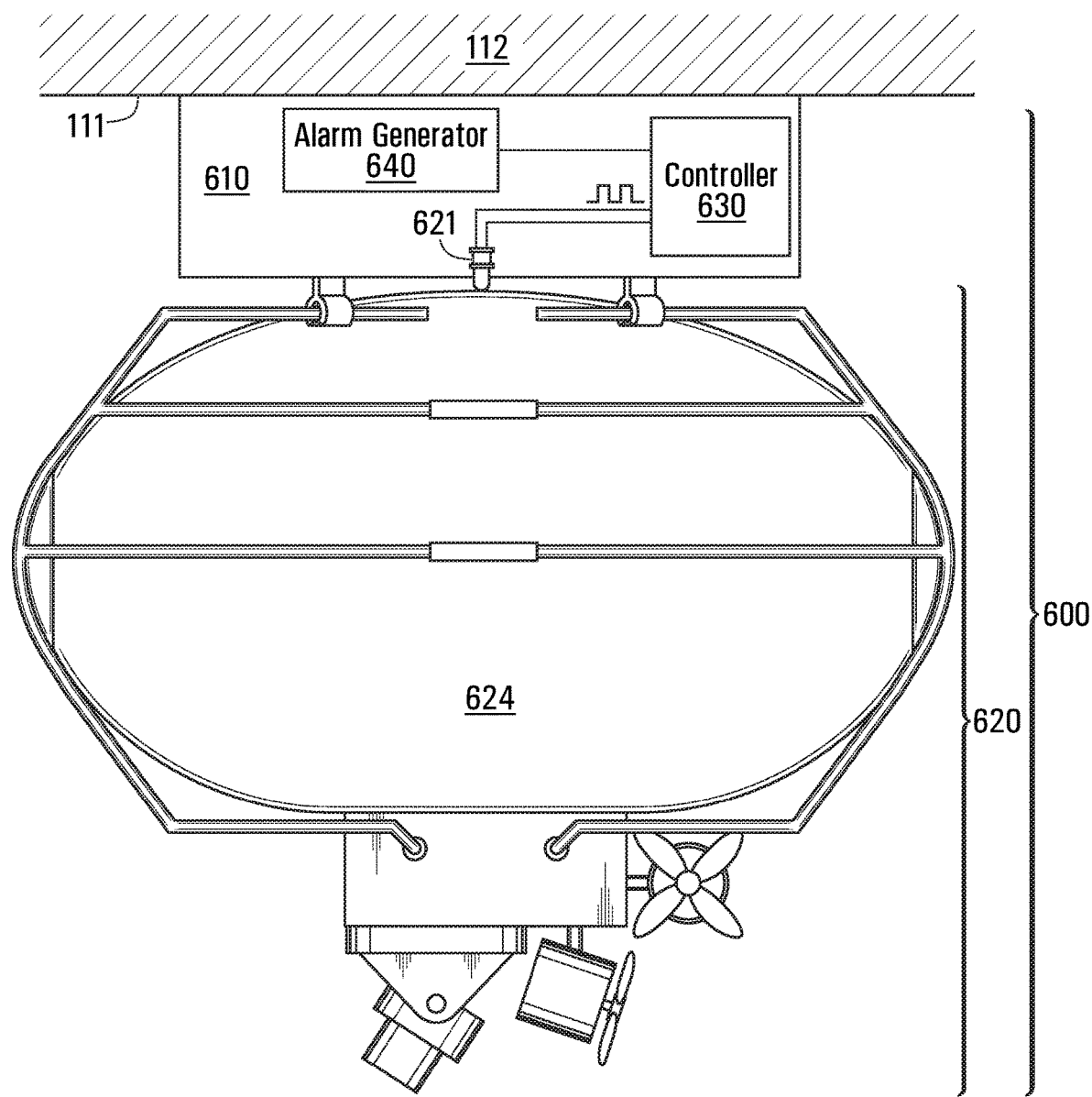
FIG. 9 is a side elevational view of a surveillance drone and docking station assembly, diagrammatically illustrated in accordance with another alternative example embodiment.

FIG. 9 shows a side elevational view of a surveillance drone and docking station assembly 600, diagrammatically illustrated in accordance with another alternative example embodiment. The surveillance drone and docking station assembly 600 includes a docking station 610 and a surveillance drone 620. Various elements of the docking station 610 and the surveillance drone 620 have been omitted for convenience of illustration and so as not to obscure an understanding of those elements that are shown.

Regarding the docking station 610, it includes a probe and transducer device 621, a controller 630 and an alarm generator 640. These cooperate as described below.

In terms of the operation of the controller 630, this sends control signals to a pressure transducer of the device 621. The pressure transducer will then push a probe of the device 620 downwards into the container 624. By measuring how much the probe is moving, and then comparing that to the control signals, it is possible to measure the pressure inside the container 624.

If the pressure inside the container 624 is calculated to be below a certain threshold, an alarm is generated by alarm generator 640. Other sensors can also be used (i.e. strain gauge on the surface of the balloon).

Figure 10:
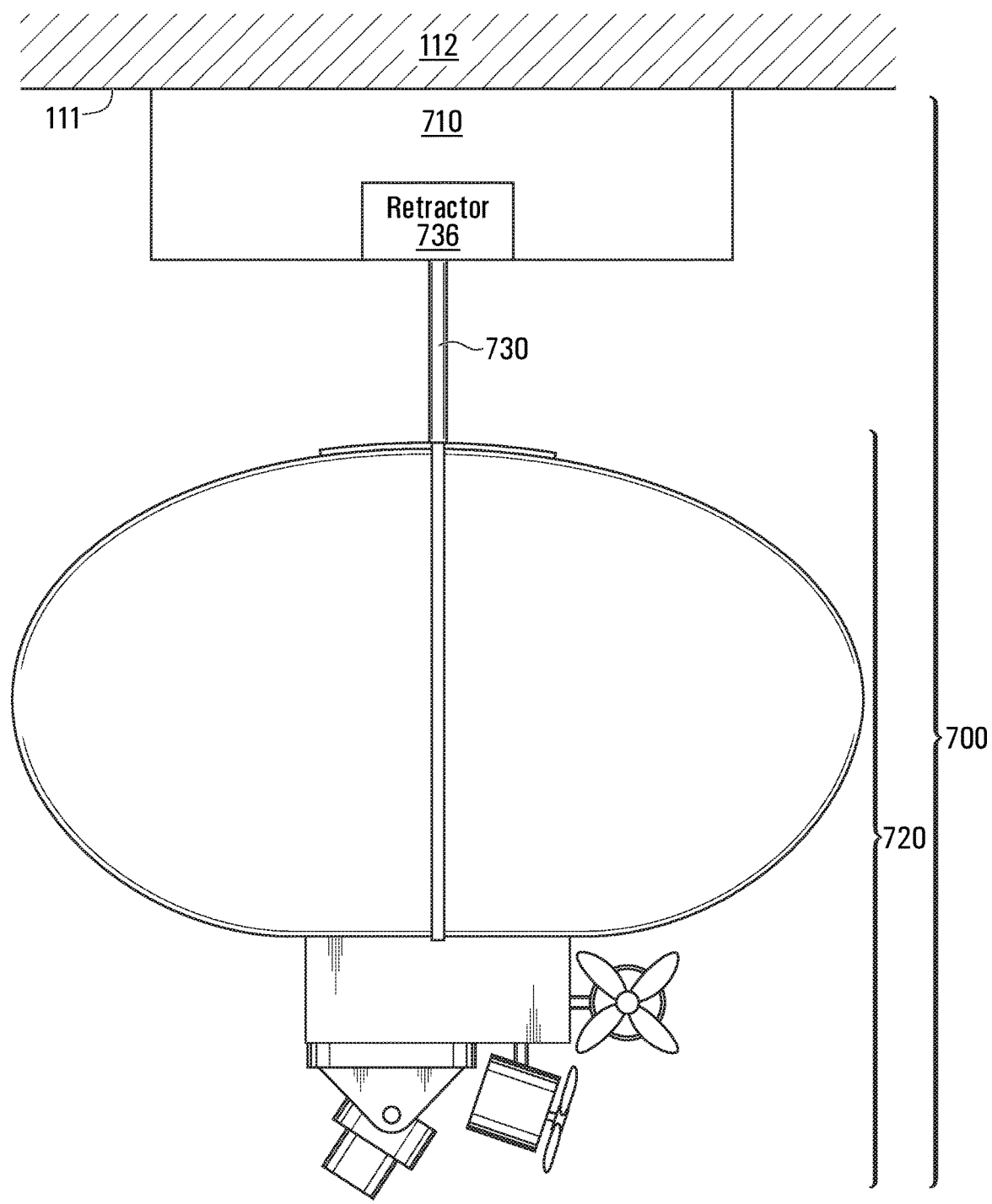
FIG. 10 is a side elevational view of a surveillance drone and docking station assembly, diagrammatically illustrated in accordance with yet another alternative example embodiment.

FIG. 10 diagrammatically illustrates a surveillance drone and docking station assembly 700 in accordance with yet another alternative example embodiment. The surveillance drone and docking station assembly 700 includes a docking station 710 and a surveillance drone 720. Various elements of the docking station 710 and the surveillance drone 720 have been omitted for convenience of illustration and so as not to obscure an understanding of those elements that are shown.

In the illustrated example embodiment of FIG. 10, surveillance drone 720 is always physically attached to the docking station 710 via a tether 730. Release from and retraction into the docking station 710 is controlled by a retractor 736. The retractor 736 also controls the released length of the tether 730 such that more length of the tether 730 is released when the surveillance drone 720 moves away from the docking station 710 and conversely the tether 730 is reeled in as it moves closer to the docking station 710. In accordance with some examples, the tether 730 encloses wires for delivering power and control signals from the docking station 710 to the surveillance drone 720. Also, the tether 730 may be made from any suitable durable and light-weight material known to those skilled in the art. For example, the tether 730 may be formed of wires covered with nylon sheathing.

Figure 11:
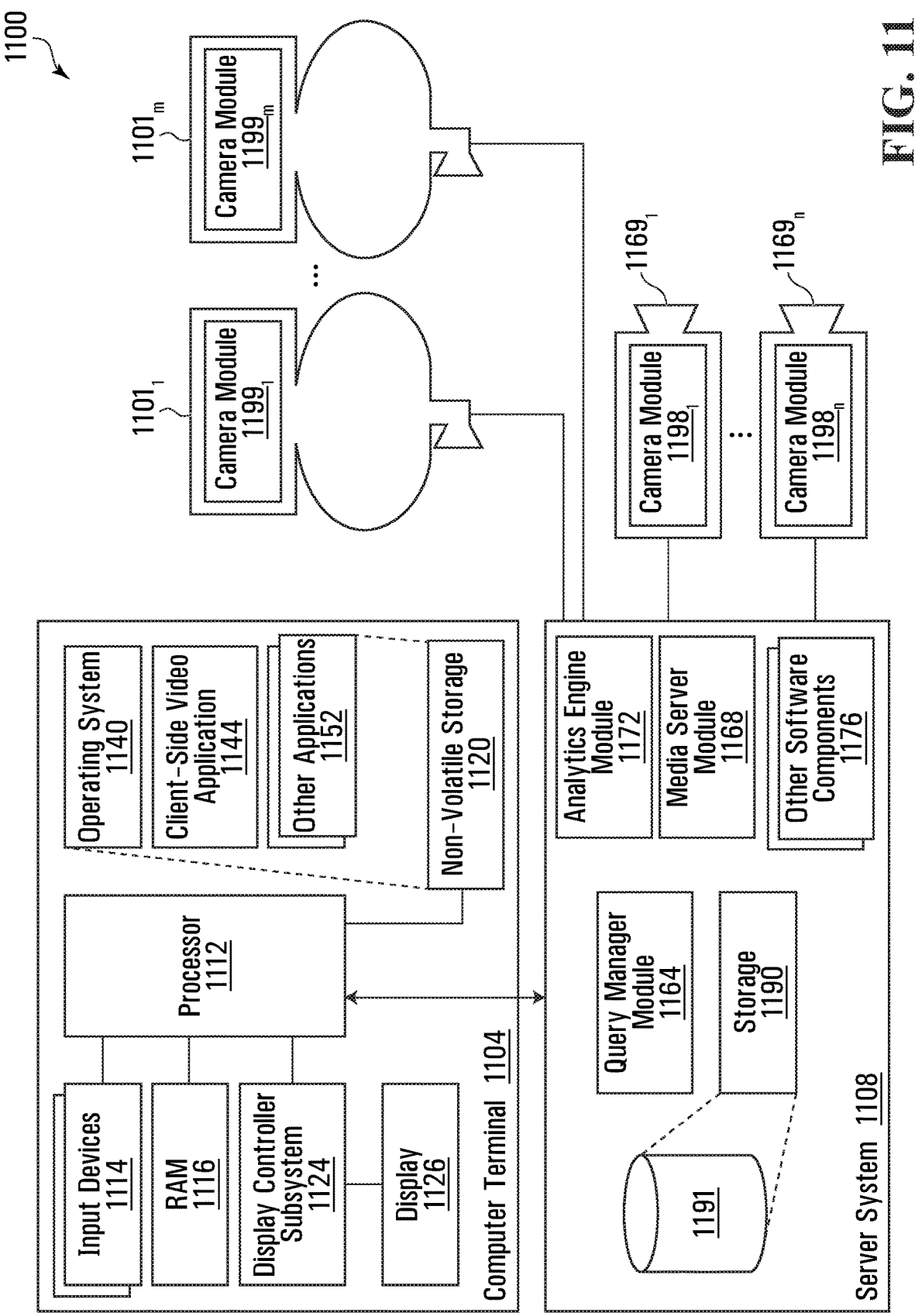
FIG. 11 shows a block diagram of an example surveillance system which may include one or more surveillance drone and docking station assemblies in accordance with any one of various example embodiments herein described.

Reference is now made to FIG. 11 which shows a block diagram of an example surveillance system 1100 which may include one or more surveillance drone and docking station assemblies 1101$_1$ . . . 1101$_m$ in accordance with any one of the various example embodiments earlier herein described. Also included within the illustrated surveillance system 1100 are one or more computer terminals 1104 and a server system 1108. In some example embodiments, the computer terminal 1104 is a personal computer system; however in other example embodiments the computer terminal 1104 is a selected one or more of the following: a handheld device such as, for example, a tablet, a phablet, a smart phone or a personal digital assistant (PDA); a laptop computer; a smart television; and other suitable devices. With respect to the server system 1108, this could comprise a single physical machine or multiple physical machines. It will be understood that the server system 1108 need not be contained within a single chassis, nor necessarily will there be a single location for the server system 1108. As will be appreciated by those skilled in the art, at least some of the functionality of the server system 1108 can be implemented within the computer terminal 1104 rather than within the server system 1108.

The computer terminal 1104 communicates with the server system 1108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 1104 and the server system 1108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 1104 and the server system 1108 are within the same Local Area Network (LAN).

The computer terminal 1104 includes at least one processor 1112 that controls the overall operation of the computer terminal 1104. The processor 1112 interacts with various subsystems such as, for example, input devices 1114 (such as a selected one or more of a keyboard, mouse, touch pad, roller ball and voice control means, for example), random access memory (RAM) 1116, non-volatile storage 1120, display controller subsystem 1124 and other subsystems [not shown]. The display controller subsystem 1124 interacts with display 1126 and it renders graphics and/or text upon the display 1126.

Still with reference to the computer terminal 1104 of the surveillance system 1100, operating system 1140 and various software applications used by the processor 1112 are stored in the non-volatile storage 1120. The non-volatile storage 1120 is, for example, one or more hard disks, solid state drives, or some other suitable form of computer readable medium that retains recorded information after the computer terminal 1104 is turned off. Regarding the operating system 1140, this includes software that manages computer hardware and software resources of the computer terminal 1104 and provides common services for computer programs. Also, those skilled in the art will appreciate that the operating system 1140, client-side video application 1144, and other applications 1152, or parts thereof, may be temporarily loaded into a volatile store such as the RAM 1116. The processor 1112, in addition to its operating system functions, can enable execution of the various software applications on the computer terminal 1104.

Regarding the video application 1144, this can be run on the computer terminal 1104 and includes a search User Interface module for cooperation with a search session manager and other modules in order to enable the computer terminal user to carry out actions related to providing input and, more specifically, input to facilitate actions such as, for example, reviewing a plurality of different video recordings and controlling operation of cameras and/or other electronic surveillance sensing devices within the surveillance system 1100. In such circumstances, the user of the computer terminal 1104 is provided with a user interface generated on the display 1126 through which the user inputs and receives information in relation to video recordings and video cameras.

The video application 1144 also includes a communications interface via which communications are sent to a query manager module 1164 of the server system 1108. In some examples, the video application 1144 communicates with the query manager module 1164 through the use of Remote Procedure Calls (RPCs).

Besides the query manager module 1164, the server system 1108 includes several software components for carrying out other functions of the server system 1108. For example, the server system 1108 includes a media server module 1168. The media server module 1168 handles client requests related to storage and retrieval of video taken by video cameras in the surveillance system 1100. The server system 1108 also includes an analytics engine module 1172. The analytics engine module 1172 can, in some examples, be any suitable one of known commercially available software that carry out mathematical calculations (and other operations) in relation to video analytics.

The server system 1108 also includes a number of other software components 1176. These other software components will vary depending on the requirements of the server system 1108 within the overall system. As just one example, the other software components 1176 might include special test and debugging software, or software to facilitate version updating of modules within the server system 1108. The server system 1108 also includes one or more data stores 1190. In some examples, the data store 1190 comprises one or more databases 1191 which facilitate the organized storing of recorded video.

In addition to being in communication with the computer terminal 1104, the server system 1108 is also in communication with one or more conventional cameras 1169$_1$ . . . 1169$_n$ and the surveillance drone and docking station assemblies 1101$_1$ . . . 1101$_m$. Possible data connections between the server system 1108 and any of the conventional cameras 1169$_1$ . . . 1169$_n$ or the surveillance drone and docking station assemblies 1101$_1$ . . . 1101$_m$ may be the same as any of those previously mentioned as possible as between the computer terminal 1104 and the server system 1108. In accordance with some examples, the server system 1108 communicates movement commands to each of the surveillance drone and docking station assemblies 1101$_1$ . . . 1101$_m$ that are aerially mobile. These movement commands are processed with the respective surveillance drones which move in accordance with the commands by appropriate control of their motor-driven propellers as has been herein explained in detail.

Regarding the video cameras 1169$_1$ . . . 1169$_n$, each of these includes a respective one of camera modules 1198$_1$ . . . 1198$_n$. Similarly each of the surveillance drone and docking station assemblies 1101$_1$ . . . 1101$_m$ includes a respective one of camera modules 1199$_1$ . . . 1199$_m$. In some examples, the camera modules 1198$_1$ . . . 1198$_n$ and the camera modules 1199$_1$ . . . 1199$_m$ each include one or more specialized chips to facilitate processing and encoding of video before it is even received by the server system 1108. For instance, the specialized chip may be a System-on-Chip (SoC) solution including both an encoder and a Central Processing Unit (CPU). These permit the camera module to carry out the processing and encoding functions. Also, in some examples, part of the processing functions of the camera module includes creating metadata for recorded video.

Certain adaptations and modifications of the described embodiments can be made. Therefore, the above discussed embodiments are considered to be illustrative and not restrictive, and the invention should be construed as limited only by the appended claims.

The invention claimed is:

1. Apparatus comprising:
    a drone including:
        a container capable of being filled with a gaseous fluid;
        a mating region located on a top side of the drone;
        a plurality of motor-driven propellers configured to control movement of the drone when aerially mobile;
        an electronic surveillance sensing device positioned below the container; and
        a rechargeable power source configured to power at least the electronic surveillance sensing device; and
    a docking station including:
        a drone-receiving port, wherein the drone is configured to dock with the docking station when the mating region of the drone engages the drone-receiving port; and
        a charger configured to charge the rechargeable power source when the drone is docked thereto, and
    wherein the docking station is configured to be installed on a surface that affords a downwards orientation for the drone-receiving port such that the drone will be below the docking station when docked thereto.

2. The apparatus of claim 1 wherein the drone further comprises a gondola body having the motor-driven propellers and the container attached thereto.

3. The apparatus of claim 2 wherein the gondola body is positioned below the container.

4. The apparatus of claim 3 wherein the electronic surveillance sensing device is attached to the gondola body.

5. The apparatus of claim 4 wherein the electronic surveillance sensing device includes a housing and a top side of the housing is attached to a bottom side of the gondola body.

6. The apparatus of claim 1 wherein the rechargeable power source is configured to deliver charge via an electrical communications path that becomes established when the drone is docked to the docking station, and becomes disconnected when the drone becomes undocked from the docking station.

7. The apparatus of claim 1 wherein the electronic surveillance sensing device is a camera.

8. The apparatus of claim 7 wherein the camera is a Pan-Tilt-Zoom (PTZ) camera.

9. The apparatus of claim 7 wherein the camera is capable of tilt and zoom movements, but not pan movement.

10. The apparatus of claim 1 wherein the surface is an indoor ceiling of a building.

11. The apparatus of claim 1 wherein the electronic surveillance sensing device, when in a powered on state, captures surveillance video.

12. The apparatus of claim 11 wherein the drone further includes communication circuitry which, when the drone is aerially mobile, transmits the captured surveillance video wirelessly to a computing device over a network.

13. The apparatus of claim 1 wherein the container is made from biaxially-oriented polyethylene terephthalate (BoPET).

14. The apparatus of claim 1 wherein the docking station further includes a dispenser configured to dispense additional gaseous fluid into the container when: i) pressure in the container is below a threshold; and ii) the drone is docked to the docking station.

15. The apparatus of claim 1 wherein the docking station further includes a probe and transducer device configured to determine whether gas pressure in the container is above or below a threshold.

16. The apparatus of claim 1 wherein the probe and transducer device includes a movable probe configured to periodically perturb the container when the drone is docked to the docking station.

* * * * *